United States Patent Office 3,409,453
Patented Nov. 5, 1968

3,409,453
PROCESS FOR PRODUCTION OF A COATING COMPOSITION COMPRISING DIALDEHYDE POLYSACCHARIDE AND SUBSTITUTED POLYSACCHARIDES
Harold Charles Stalter, Edwardsburg, Mich., assignor to Miles Laboratories, Inc., Elkhart, Ind., a corporation of Indiana
No Drawing. Filed Oct. 31, 1966, Ser. No. 590,547
6 Claims. (Cl. 106—203)

ABSTRACT OF THE DISCLOSURE

The process of mixing dialdehyde polysaccharide with carboxylated, hydroxyethylated, acetylated or enzyme converted polysaccharides in water at a pH of 5–6 containing 16–30 percent solids, reacting the mixture at 80–85° C. with agitation for at least 60 minutes and then cool the reaction products.

---

This invention relates to a process for producing compositions capable of forming oleophobic coatings which are resistant to penetration by greases and solvents.

Cellulosic materials, such as paper, frequently find use in applications where resistance to penetration by greases and solvents, sometimes known as grease holdout or solvent holdout, is extremely important. Impermeability to fats and oils is desired in wrappings for greasy or oily products, such as bacon board, butter wrap, bakery bags and meat wrapping. Solvent holdout is also important in paper cup liners and paper plates. This property may also be desired in uses involving lacquer applications, such as varnishing and waxing of labels. Solvent holdout is further significant in the production of papers used in certain types of electrostatic reproduction, and it is also important in spot carbonizing.

Various compositions have been used to provide coated papers which are intended to have desirable solvent holdout properties. For example, starch-clay mixtures have been used with varying degrees of success. Resin coatings have also been relied upon to some extent. However, these compositions have not been totally satisfactory because they still allow undesirable amounts of solvent penetration through pinholes or minor imperfections in the coatings. The prior art coating compositions have also resulted in the formation of coated papers of generally undesirably heavy weight.

An advance has recently been made in this art wherein a novel composition has been provided which is capable of forming a coating which is resistant to grease and solvent penetration. This novel composition comprises the reaction product of from about 1 to about 50 parts by weight dialdehyde polysaccharide and from about 50 to about 99 parts by weight of a polysaccharide derivative selected from the class consisting of carboxylated polysaccharides, hydroxyethylated polysaccharides, acetylated polysaccharides and enzyme converted polysaccharides. This composition, when applied in the form of a dispersion to the surface of a substrate, such as cellulosic paper, forms a coating which has improved resistance to grease and solvent penetration. The coating can be applied easily in a uniform manner, and it is of relatively light weight when compared to prior art coatings intended for similar purposes. Preferably the composition contains the reaction product of from about 10 to about 15 parts by weight dialdehyde polysaccharide and from about 85 to about 90 parts by weight of the polysaccharide derivative.

This novel composition has previously been prepared by mixing the appropriate amounts of dialdehyde polysaccharide and polysaccharide derivative in water to form a slurry containing from about 1 to about 50 weight percent solids and reacting the non-aqueous constituents of the slurry with each other by heating the slurry with agitation to a temperature from about 80° C. to about 100° C. for about 15 to 30 minutes until the dispersion of the solid material is complete. Once the reaction mixture is in the desired state of colloidal solution or dispersion, the temperature is lowered to about 50° C. in order to prevent undesirable degradation of the reaction product.

It has been found that while the above procedure can produce satisfactory coatings having desirable solvent holdout properties, there were occasions when unsatisfactory coatings were produced.

It is an object of the present invention to provide an improved process for the production of compositions capable of forming coatings having satisfactory solvent holdout properties.

In acordance with the present invention, a process is provided which comprises mixing from about 1 to about 50 parts by weight dialdehyde polysaccharide with from about 50 to about 99 parts by weight of a polysaccharide derivative selected from the class consisting of carboxylated polysaccharides, hydroxyethylated polysaccharides, acetylated polysaccharides and enzyme converted polysaccharides in water at a pH from about 5 to about 6 to form a slurry containing from about 16 to about 30 percent (weight/volume basis) solids, reacting the polysaccharide constituents of the slurry with each other by heating the slurry to a temperature from about 80° C. to about 85° C. with agitation for at least about 60 minutes, and then cooling the dispersed reaction product to a temperature below about 50° C. It is preferred that the slurry pH be adjusted to a value between about 5 and about 5.5. It is also preferred that the reaction mixture contain from about 10 to about 15 parts by weight dialdehyde polysaccharide and from about 85 to about 90 parts by weight of the polysaccharide derivatives. It is further preferred that the reaction mixture be heated about 90 minutes to produce the desired dispersion.

When the pH of the reaction mixture slurry is above about 6.0, there is undesirable degradation of the polysaccharide reactants often resulting in coated papers of unsatisfactory solvent holdout properties. When the pH of the reaction mixture slurry is below about 5.0, an undesirably high viscosity results. If the pH is maintained within the range of from about 5.0 to about 6.0, and preferably from about 5 to about 5.5, consistent satisfactory results are obtained.

The pH of the reaction mixture slurry is conveniently and preferably adjusted to the desired value by mixing an appropriate amount of citric acid with the dialdehyde polysaccharide and polysaccharide derivative prior to adding such mixture to water. It should be understood, however, that the present invention also includes the addition of the acid separately to the slurry or the addition of the acid to the water prior to formation of the slurry. The critical point is to provide the above pH values in the slurry while it is being heated to form the reaction product dispersion. While citric acid is the preferred acidulant, it is recognized that other organic acids, such as acetic, fumaric, malic and the like, or mineral acids, such as sulfuric, hydrochloric and the like, can also be used.

The dialdehyde polysaccharides useful as starting materials in the process of the present invention are well known in the art. Such materials are frequently referred to as periodate oxidized polysaccharides because of their preparation by the well known oxidation of polysaccharides with periodic acid. The dialdehyde polysaccharides may be the dialdehyde derivatives of any polysaccharide, such as corn, wheat, rice, tapioca or potato starches, amyloses, amylopectins, celluloses, gums, dextrans, algins, inulins and the like. Of these polysaccharides, the dialdehyde derivatives of starch known generally as dialdehyde starch are the best known and most widely used. However, where it is desired to have dialdehydes of other polysaccharides, these may be used as well. The dialdehyde polysaccharides useful in the present invention can contain from about 0.5 to about 100 mole percent dialdehyde polysaccharide units. In general, it is preferred to use dialdehyde polysaccharides which are about 90 to 100 percent oxidized, i.e., those wherein about 90 to 100 out of each 100 of the original anhydroglucose units have been converted to dialdehyde units, such as by periodate oxidation as above described.

The carboxylated polysaccharides, such as hypochlorite oxidized starches, to be used as starting materials in the process of the present invention are well known in the art. They are generally prepared by reacting a mild oxidizing agent, such as an alkaline hypochlorite salt or hydrogen peroxide, with a polysaccharide of the type described above to oxidize the $-CH_2OH$ groups on the anhydroglucose monomer units to $-COOH$ groups. It is also well known that the commercialy available carboxylated polysaccharides, such as the hypochlorite oxidized starches, have a degree of oxidation such that the $-CH_2OH$ groups in about 1 to about 10 out of 100 of the original anhydroglucose units in the polysaccharide have thus been oxidized.

The hydroxylated polysaccharides, such as hydroxyethylated starches, to be used in the present invention are also well known in the art. They are generally prepared by reacting ethylene oxide with a polysaccharide of the type described above in an alkaline medium to from ether linkages with the $-CH_2OH$ groups and thus result in $-CH_2OCH_2CH_2OH$ groups attached to some of the anhydroglucose monomer units. It is also known that such hydroxyethylation takes place on only from about 1 to about 10 out of 100 of the original anhydroglycose units in the polysaccharide.

The acetylated polysaccharides, such as acetyl esters of starch, to be used in the present invention are well known in the art. They are generally prepared by reacting acetic anhydride with a polysaccharide of the type described above to form ester linkages with some of the hydroxyl groups of the anhydroglucose units. It is known that such ester formation takes place in from about 1 to about 10 out of 100 of the original anhydroglucose units in the polysaccharide.

The enzyme converted polysaccharides, such as enzyme converted starches, to be used in the present invention are also well known in the art. They are generally prepared by treating a polysaccharide of the type described above with an alpha-amylase so as to break up the long chain polysaccharide into shorter chain segments having an overall reduced viscosity. It is generally known that an enzyme converted starch that might have utility in paper coating compositions should have a viscosity less than about 300 centipoises and preferably from about 50 to about 150 centipoises.

The reaction product dispensions prepared in accordance with the present invention can be easily applied to various types of cellulosic webs or papers in any conventional manner to provide a substantially uniform coating on the paper. Application can be, for example, by size press, calender stack, air knife, blade coaters, roll coaters or rod coaters. Application can be made on-machine or off-machine as desired. The resulting coated cellulosic web is then dried and stored for later use.

The thus prepared coated cellulosic material is characterized as being resistant to penetration by a wide variety of solvents, such as oils, greases, hydrocarbons and the like. The coatings on the cellulosic material are also of relatively light weight.

The process of the present invention enables reproducibility on a commercial scale to be achieved for production of coated papers having desired solvent holdout properties.

The invention will be further described in the following examples:

Example 1

A dry blend of 12 parts by weight dialdehyde corn starch being about 96 percent oxidized, 88 parts by weight of a hypochlorite oxidized corn starch (Douglas Clearsol Gum, Grade W., sold by Penick & Ford, Ltd.) and about 0.25 part by weight citric acid was slurried in water at a 25 weight percent concentration. The slurry was prepared by adding, with stirring, 100 grams of the above dry blend of dialdhyde starch, hypochlorite oxidized starch and citric acid to 300 grams of distilled water at room temperature (about 20° C.–25° C). The resulting slurry had a pH value in the range of 5.0 to 5.5. The temperature was then raised to 80° C. to 85° C. and held at this temperature range with stirring for 90 minutes. The resulting fluid dispension was then cooled to room temperature and diluted wtih distilled water to form a 15 weight percent dispension. This dispersion was then applied to sheets of a cellulosic paper coating-base stock using a No. 18 Meyer draw down rod in such a manner as to obtain a coating weight of from 4 to 6 pounds per 3000 sq. feet. The cellulosic paper coating-base stock was a paper which is typically unsized with a fairly tight formation so that a minimum amount of coating is absorbed into the sheet as opposed to remaining on the surface of the stock. This paper before coating was instantly penetrated by toluene. The wet coating on the paper was dried by directing a hot air stream on the coated surface of the paper until the coating was dry to the touch. The drying of the coated paper was completed by passing the coated sheet through the steam heated dryer of a Noble and Wood Sheet Machine for 3 minutes at 105° C. The coated sheet was then lightly calendered. The solvent holdout characteristics of the coated paper were then determined by placing it, coated side up, on a support which allowed viewing of the bottom side of the sheet with a mirror set at a suitable angle and adding a drop of toluene to the upper surface of the paper. The underside of the paper was observed for wetting by the toluene. The time for development of wetting was noted. The wetting was generally observed as being localized in small areas or pinholes. The toluene formed a bead on the top surface of the paper and only about 5 pinholes were observed in 5 seconds. This is a satisfactory solvent holdout coating.

Example 2

A dry blend of 12 parts by weight dialdehyde corn starch being about 96 percent oxidized, 88 parts by weight of a hypochlorite oxidized corn starch (Douglas Clearsol Gum, Grade W., sold by Penick & Ford, Ltd.) and about 0.25 weight part of citric acid was added in varying amounts to different portions of distilled water at room temperature to form slurires having various concentrations. The individual percentage concentrations (weight/volume basis) prepared were: 14, 16, 18, 20, 22, 24, 26, 28 and 30. The pH values of the cold slurries were all in the range of 5 to 5.07. These slurries were then heated to 80° C. to 85° C. for 90 minutes to form dispersions, cooled to room temperature and then applied to paper according to the procedure of Example 1 above. The solvent holdout characteristics of the resulting coated papers were then determined according to the procedure of Example 1. The paper coated with the dispersion having a concentration of 14 percent had reduced solvent holdout of toluene. All the other coated papers held back toluene penetration such that no more than 5 pinholes were observed in 5 seconds. It thus appears that concentrations of from about 16 to about 30 percent (weight/volume basis) are suitable for making satisfactory solvent holdout coatings. At concentrations above about 30 percent the dispersion has an undesirably high viscosity.

Example 3

Various dry blends of dialdehyde corn starch, hypochlorite oxidized starch and citric acid were employed to form slurries having pH values of 5.5. The resulting slurries were then heated to 80° C. to 85° C. for 75–80 minutes to form dispersions. The resulting dispersions were then employed to coat paper according to Example 1 and the resulting coated papers were tested for solvent holdout characteristics according to Example 1. All the coated papers had satisfactory solvent holdout characteristics. The sepaarte blends had the following compositions:

| Blend | Grams Hypochlorite Oxidized Starch | Grams Dialdehyde Starch | Milligrams Citric Acid |
|---|---|---|---|
| A | 90 | 10 | 190 |
| B | 89 | 11 | 190 |
| C | 88 | 12 | 250 |

In summary, the present invention relates to the specific process conditions, principally adjustment of critical pH values, that are desirable to obtain commercially reproducible solvent holdout coatings formed from the reaction product between dialdehyde polysaccharides and certain polysaccharide derivatives.

What is claimed is:

1. A process for the preparation of a composition suitable for the production of coatings which are resistant to solvent penetration which comprises mixing from about 1 to about 50 parts by weight dialdehyde polysaccharide with from about 50 to 99 parts by weight of a polysaccharide derivative selected from the class consisting of carboxylated polysaccharides, hydroxyethylated polysaccharides, acetylated polysaccharides and enzyme converted polysaccharides in water at a pH from about 5 to about 6 to form a slurry containing from about 16 to about 30 percent (weight/volume basis) solids, reacting the polysaccharide constituents of the slurry with each other by heating the slurry to a temperature from about 80° C. to about 85° C. with agitation for at least about 60 minutes, and then cooling the dispersed reaction product to a temperature below about 50° C.

2. A process according to claim 1 wherein the pH of the slurry is from about 5 to about 5.5.

3. A process according to claim 1 wherein the pH of the slurry is adjusted to a value within the range of from about 5 to about 6 by the presence of citric acid.

4. A process according to claim 1 wherein the dialdehyde polysaccharide is present in an amount from about 10 to about 15 parts by weight and the polysaccharide derivative is present in an amount from about 85 to 90 parts by weight.

5. A process according to claim 1 wherein the slurry is heated with agitation for about 90 minutes.

6. A process according to claim 1 wherein a mixture of from about 10 to about 15 parts by weight dialdehyde polysaccharide and from about 85 to 90 parts by weight of a hypochlorite oxidized polysaccharide are slurried in water which has been adjusted to a pH of from about 5 to about 5.5 by the presence of citric acid and the resulting slurry is heated to a temperature from about 80° C. to about 85° C. with agitation for about 90 minutes.

References Cited

UNITED STATES PATENTS

| | | | |
|---|---|---|---|
| 2,988,455 | 6/1961 | Rosenberg et al. | 106—169 |
| 3,145,116 | 8/1964 | Zienty | 106—210 |
| 3,062,703 | 11/1962 | Hofreiter et al. | 162—175 |

JULIUS FROME, *Primary Examiner.*

T. MORRIS, *Assistant Examiner.*